April 17, 1928.
A. T. HOLMAN ET AL
1,666,383
ROCK DRILL AND LIKE TOOL
Filed July 13, 1926    5 Sheets-Sheet 1
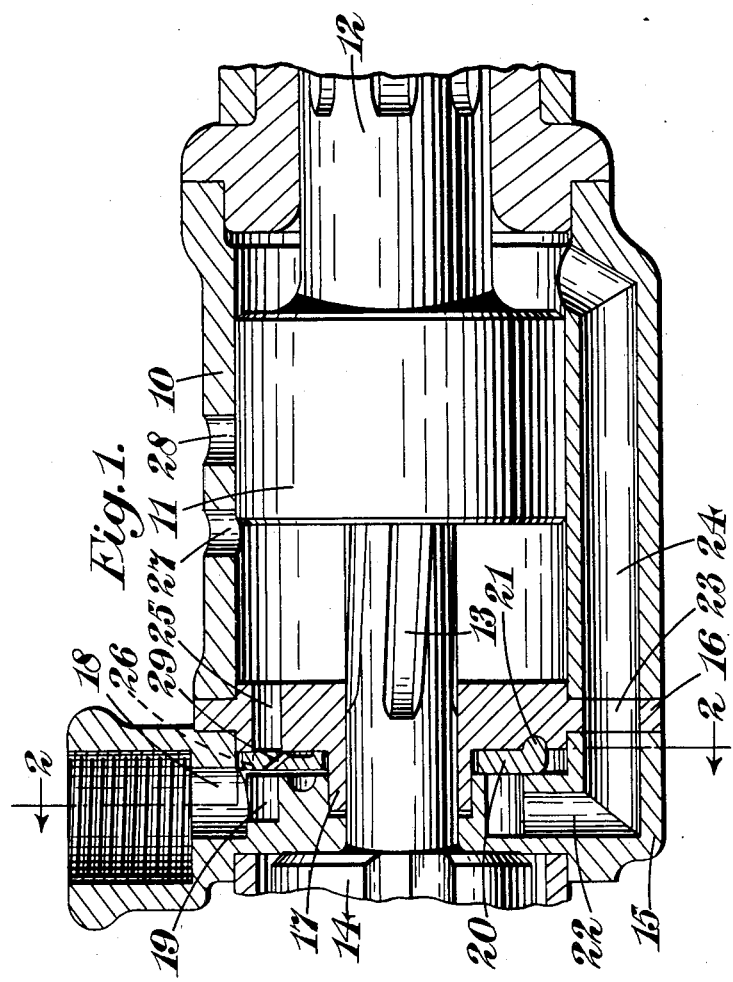
INVENTORS
Arthur Trevor Holman
Percy Mynors Holman
by
Byrnes, Stebbins & Parmelee
their Attorneys

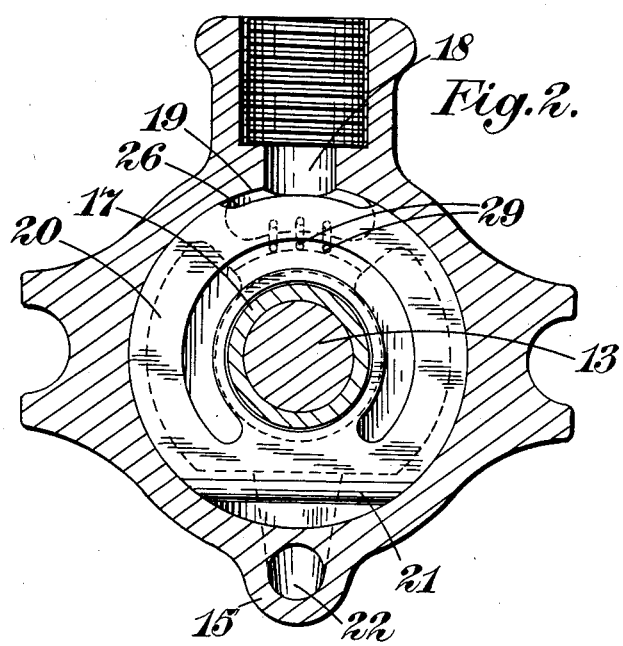
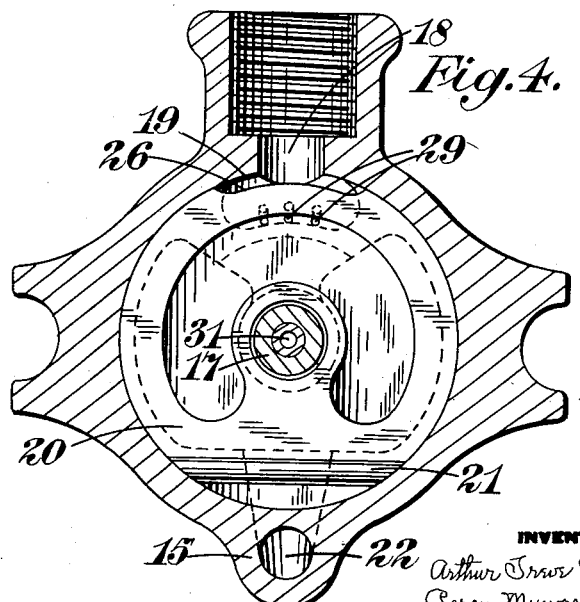

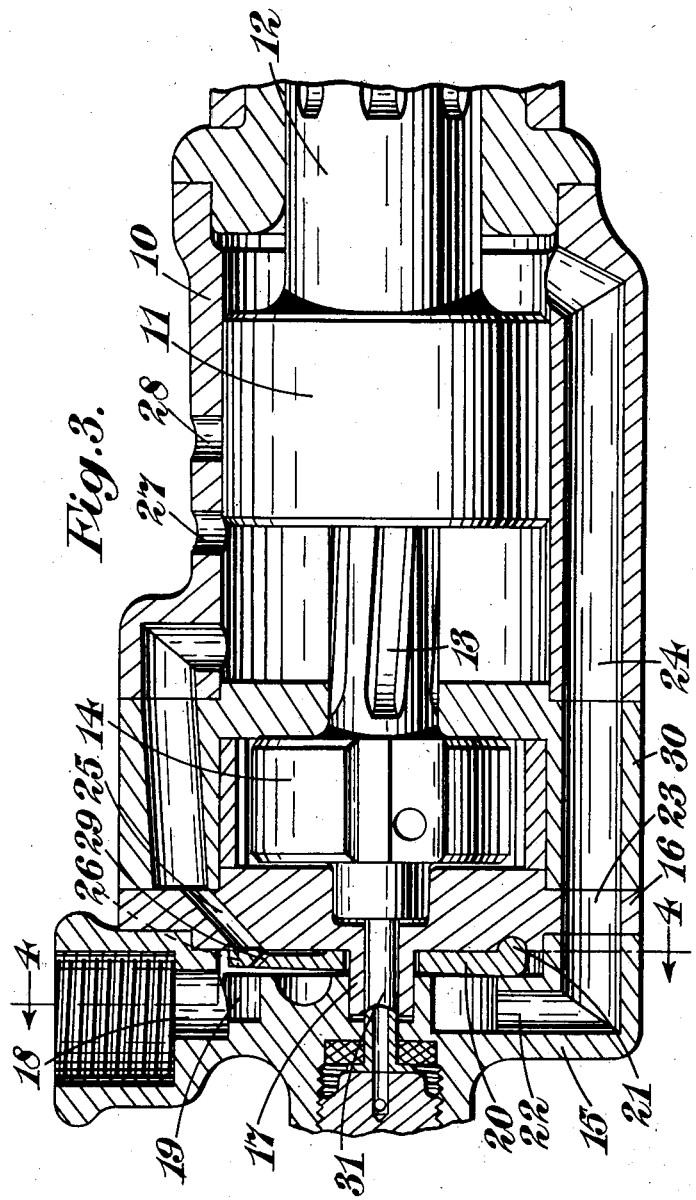

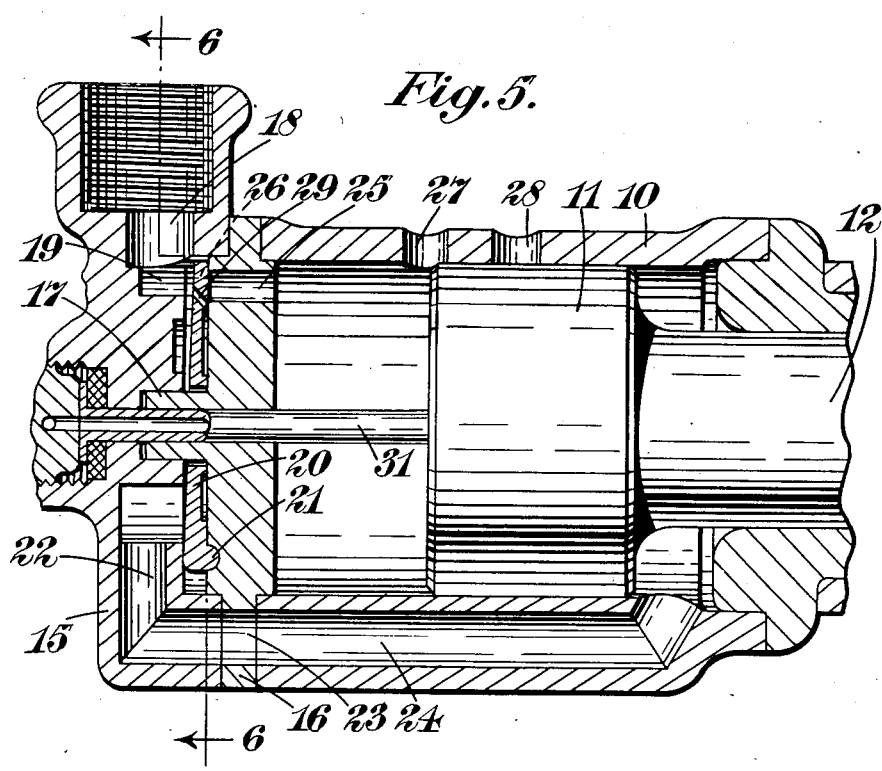
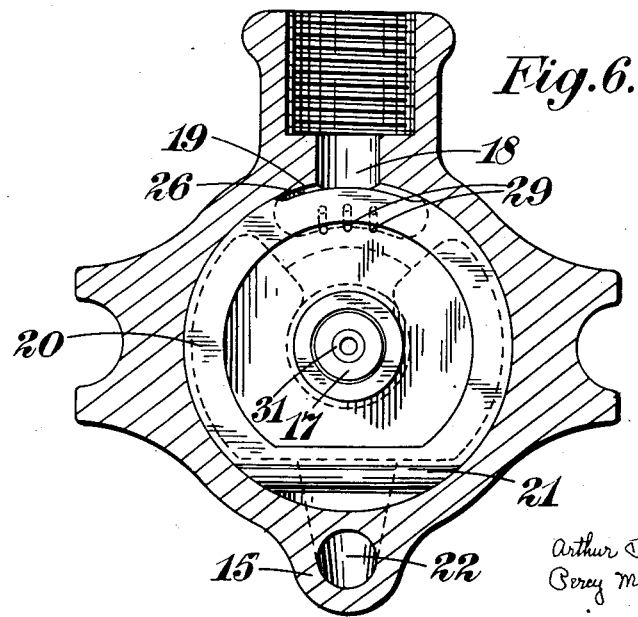

April 17, 1928.  1,666,383
A. T. HOLMAN ET AL
ROCK DRILL AND LIKE TOOL
Filed July 13, 1926  5 Sheets-Sheet 5
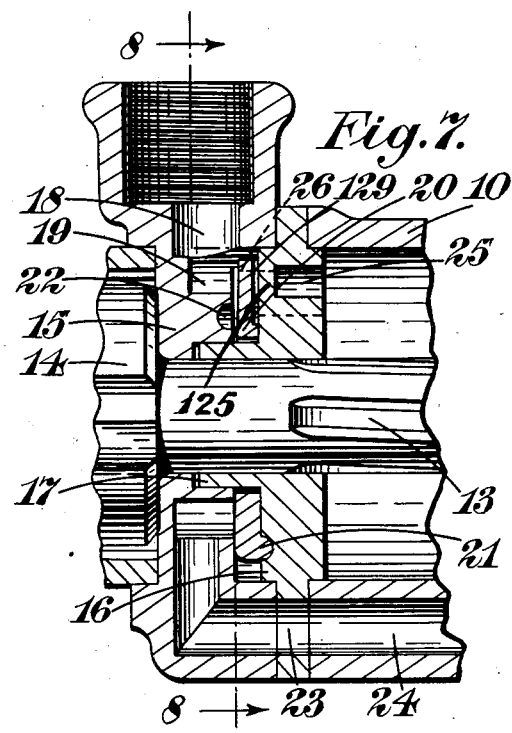
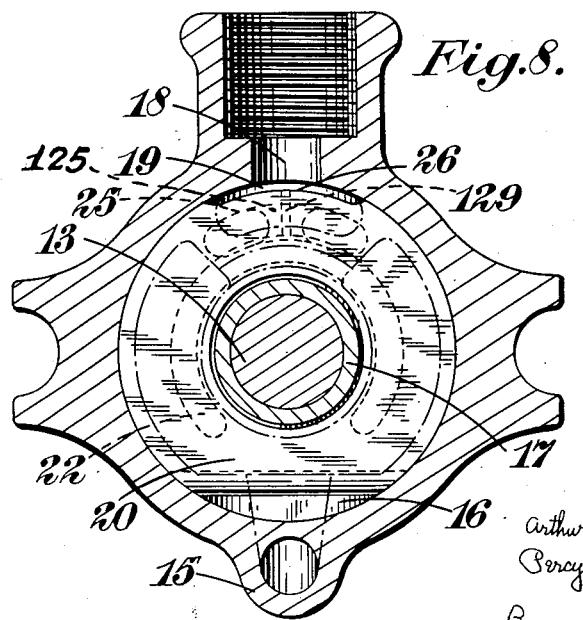
INVENTORS
Arthur Trevor Holman
Percy Mynors Holman
by
Byrnes, Stebbins & Parmelee
their Attorneys Patented Apr. 17, 1928.

1,666,383

UNITED STATES PATENT OFFICE.

ARTHUR TREVE HOLMAN AND PERCY MYNORS HOLMAN, OF CAMBORNE, ENGLAND, ASSIGNORS TO HOLMAN BROTHERS LIMITED, OF CAMBORNE, CORNWALL, ENGLAND, A BRITISH COMPANY.

ROCK DRILL AND LIKE TOOL.

Application filed July 13, 1926, Serial No. 122,180, and in Great Britain June 3, 1926.

This invention consists in improvements in or relating to rock drills and like tools such as pneumatic hammers, riveters, caulkers, picks and such like and where the term "rock drill" appears hereinafter, it is to be understood as including all tools driven by compressed fluid such as compressed air to which the improvements, to be described below, are applicable.

According to the present invention an inlet valve for controlling admission of driving fluid to the main cylinder comprises a plate valve disposed within the end of the cylinder casing in a plane transverse to the cylinder axis. For instance the valve is conveniently disposed within a recess in the cylinder end block.

More particularly the invention comprises an inlet valve in the form of a ring which is arranged coaxially with the cylinder and surrounds a part of the drill mechanism (such, for example, as a water tube or twist bar) which is also coaxially arranged therein.

The valve is preferably hinged at or near one end of a diameter thereof and is associated with passages leading respectively into opposite ends of the cylinder and opening in ports controlled by opposite faces of the valve.

The invention also includes a hinged or other plate or like valve having one or more passages which permit driving fluid to pass to opposite faces of the valve for the purpose of balancing or of tending to balance the pressure of the driving fluid on the two sides of the valve. The object of this is to increase the liveliness in the action of the valve.

In order that the invention may be more clearly understood some preferred constructions embodying the invention will now be described with the aid of the accompanying drawings in which—

Figure 1 is a section containing the axis of the cylinder showing such parts of the drill as are necessary for the understanding of the invention;

Figure 2 is a section on the line 2—2 of Figure 1;

Figure 3 is a view corresponding to Figure 1 showing another application of the invention;

Figure 4 is a section on the line 4—4 of Figure 3;

Figure 5 is another view also similar to Figure 1 showing a still further application of the invention;

Figure 6 is a section on the line 6—6 of Figure 5;

Figure 7 is a further view similar to Figure 1 of another construction embodying the invention; and Figure 8 is a section on the line 8—8 of Figure 7.

Like reference numerals indicate like parts in the several figures of the drawings.

Referring first of all to Figures 1 and 2 the drill cylinder is indicated at 10 and the hammer piston at 11 with a portion of the fluted hammer extension shown at 12. The usual twist bar 13 is provided and the portion of the ratchet twist mechanism of known construction is indicated at 14.

One end of the cylinder is closed by means of a cap or cylinder block 15 between which and the adjacent end of the cylinder 10 is interposed an annular plate 16 which closely surrounds the twist bar 13 and is formed with a boss 17 which is received in an annular recess formed for that purpose in the part 15.

A main air inlet passage 18, the outer end of which is provided with a screwed junction portion as shown, enters radially in the end block 15 and opens into a segmental chamber 19. Between the inner surface of the part 15 and the annular plate 16 is located a main inlet control valve 20 of annular form. The central aperture in the valve 20 surrounds the boss 17. The valve is not completely circular as near one end of a diameter thereof it terminates in a straight edge affording a rib 21 which, as shown in Figure 2, extends parallel to a diameter of the valve. The rib 21 seats in a correspondingly formed recess in the plate 16 and constitutes a hinge by which a small pivotal movement of the valve 20 can take place.

In the end block 15 is a passage 22 which opens to one face of the valve and extends completely around the axis of the cylinder as shown in Figure 2, the depth of the passage being different at different positions around the axis. The passage 22 is in open communication with a port 23 in the ring 16 and through that port with an inlet passage 24 formed in the cylinder wall and leading to one end of the cylinder. Another port 25 passing through the plate 16 communicates between the opposite end of the cylinder and that face of the valve 20 which is remote from the opening of the passage 22. The edge of the valve is cut away at 26 to permit air from the inlet passage 18 to pass to the port 25 when the valve is raised clear of that port.

The action of the valve is as follows:— With the parts in the position illustrated, air or other driving fluid entering the inlet 18 passes through the passage 22 over the face of the valve 20 and thence through port 23 and passage 24 to the front of the piston 11. The piston travels rearwardly and at the commencement of its stroke air behind the piston is exhausted through an exhaust port 27. When this port is closed the air behind the piston becomes compressed and exerts pressure through the passage 25 on the valve 20. Further travel of the piston uncovers the exhaust port 28 thereby releasing the driving fluid from the forward end of the cylinder and causing a sudden drop in pressure on the surface of the valve facing the opening of the passage 22. This reduction of pressure on one face of the valve in addition to the pressure being exerted on the other face of the valve by the travel of the piston towards it causes the valve to swing over and close the passage 22 and to open the passage 25 to driving fluid. The piston then commences to travel back and the cycle of operations is reversed.

In order to increase the liveliness of the valve small ports or passages 29 are conveniently provided to allow air to pass through from one face to the other of the valve and thereby tend to balance pressure on the opposite faces thereof.

In the construction illustrated in Figures 3 and 4 the general arrangement of the valve and the ports which it controls is similar to that described in connection with Figures 1 and 2. In Figures 3 and 4, however, the parts are shown somewhat differently disposed in that the ratchet mechanism 14 is now situated between the plate 16 and the end of the cylinder 10 and a spacing ring 30, providing a recess for the ratchet mechanism 14 is interposed between the ring 16 and the cylinder 10. The boss 17 in this case surrounds a water tube 31 the end of which opens in the screwthreaded socket in the end of the cylinder block 15, the socket providing a union for the connection of a water supply pipe, not shown.

In Figures 5 and 6 a still further modification is shown in which the twist bar 13 and ratchet mechanism 14 are dispensed with and only the water tube remains to be accommodated coaxially in the ring 16 and valve 20. In this construction the drill bit is intended to be rotated by means which do not depend upon the provision of the usual twist mechanism such as is indicated in Figures 1 to 4. For instance, an auxiliary motor operatively connected in any preferred manner with the drill bit or chuck therefor may be employed.

The construction illustrated in Figures 7 and 8 is similar to that of Figure 1 and 2 except that in place of the passages 29, which pass completely through the thickness of the valve, a passage is provided by a narrow groove 129 formed in the material of that face of the valve which is remote from the main inlet 18. Furthermore, instead of a single port 25 to be controlled by the face of the valve just mentioned, there are now two such ports with a bridge 125 of solid material between them and immediately beneath the groove 129. Thus, when the valve is in a position to close the ports 25 a narrow passage is afforded by the groove 129, the margins of which engage with the bridge 125, to permit driving fluid to pass through and thus tend to balance the pressure on the valve.

It is obvious that whereas several constructions embodying the present invention have been described in detail the constructional form of the parts illustrated are by way of example only and the shape and general formation of the various parts may be modified to suit requirements within the scope of the invention as defined by the appended claims. For instance the surface of the valve which controls the ports leading to the cylinder need not necessarily be smooth as they may be formed with projections which will seat into the ends of the ports or into valve seats formed therein and such valves are to be understood as included in the expression "plate or like valves" employed herein. The invention also includes the use of passages, such as 29 or 129, in valves arranged in different relation to the cylinder from that described herein. For instance, passages such as 29 or 129 in a valve such as is described in British application No. 6307 of 1926, whether the valve is hinged at one end or is designed to rock about a central pivot (as described, for example, in British specification No 236,797) are deemed to be included within the scope of the present invention.

We claim:—

1. In a fluid-operated rock-drill, the combination with a cylinder structure of a plate valve terminating near one end of a diameter thereof in a straight edge affording a rib extending from one face of the valve, a recess in an end wall of the cylinder structure for receiving said valve in a plane transverse to the cylinder axis, a groove in one face of said recess to receive said rib about which the valve is adapted to oscillate, and at least one passage through said valve to permit fluid to pass to opposite faces of the valve.

2. In a fluid-operated rock-drill, the combination with a cylinder structure of a plate valve terminating near one end of a diameter thereof in a straight edge affording a rib extending from one face of the valve, a recess in said cylinder structure for receiving said valve, a groove in one face of said recess for receiving said rib about which the valve is adapted to oscillate and at least one passage through said valve to permit fluid to pass to opposite faces of the valve.

3. For a fluid-operated rock-drill having a cylinder structure, a recess in an end of said cylinder structure in which is received a part of the drill mechanism, ports in said recess, passages in said cylinder structure leading from said ports to opposite ends of the cylinder and a groove in one face of said recess, an integer comprising an annular plate valve adapted to be disposed within said recess and surrounding the said part of the drill mechanism that enters the recess, said valve terminating near one end of a diameter thereof in a straight edge affording a rib which extends from one face of the valve and is adapted to be received in said groove to afford a pivot about which the valve is adapted to oscillate, said valve being also adapted to control by its opposite faces respectively the said ports in the recess, and at least one passage in said valve to permit fluid to pass to opposite faces of the valve.

In testimony whereof we have signed our names to this specification.

ARTHUR TREVE HOLMAN.
PERCY MYNORS HOLMAN.